United States Patent [19]
Yamasaki et al.

[11] Patent Number: 5,788,838
[45] Date of Patent: *Aug. 4, 1998

[54] ULTRAPURE WATER PRODUCTION SYSTEM HAVING PRETREATMENT SYSTEM FOR PERFORMING BOTH ANAEROBIC AND AEROBIC ORGANISM TREATMENTS

[75] Inventors: Kazuyuki Yamasaki, Hiroshima; Seiji Okamoto, Fukuyama; Atsushi Yokotani, Fukuyama; Kazuyuki Sakata, Fukuyama, all of Japan

[73] Assignee: Sharp Kabushiki Kaisha, Japan

[*] Notice: The term of this patent shall not extend beyond the expiration date of Pat. No. 5,578,214.

[21] Appl. No.: 701,857

[22] Filed: Aug. 23, 1996

[30] Foreign Application Priority Data

Sep. 6, 1995 [JP] Japan ................................. 7-228884

[51] Int. Cl.$^6$ ........................................... C02F 3/06
[52] U.S. Cl. .................. 210/150; 210/195.1; 210/202; 210/259; 210/262
[58] Field of Search ........................ 210/150, 151, 210/195.1, 195.3, 202, 259, 262, 631

[56] References Cited

U.S. PATENT DOCUMENTS

| | | | |
|---|---|---|---|
| 4,800,021 | 1/1989 | Desbos | 210/150 |
| 4,895,645 | 1/1990 | Zorich, Jr. | 210/150 |
| 5,049,266 | 9/1991 | Götz et al. | 210/151 |
| 5,147,547 | 9/1992 | Savall et al. | 210/150 |
| 5,302,288 | 4/1994 | Meidl et al. | 210/631 |
| 5,423,988 | 6/1995 | Yamasaki et al. | 210/151 |
| 5,578,214 | 11/1996 | Yamasaki et al. | 210/151 |
| 5,599,443 | 2/1997 | Yamasaki et al. | 210/151 |
| 5,632,885 | 5/1997 | Yamasaki et al. | 210/195.3 |

FOREIGN PATENT DOCUMENTS

| | | |
|---|---|---|
| 54-107153 | 8/1979 | Japan . |
| 06233997A | 2/1994 | Japan . |
| 06063592A | 8/1994 | Japan . |

*Primary Examiner*—Christopher Upton
*Attorney, Agent, or Firm*—Nixon & Vanderhye

[57] ABSTRACT

There is provided an ultrapure water production system which allows recycled waste water to be microbially treated and thereby reclaimed without causing any clogging of treatment system due to abnormal propagation of microorganisms, and which allows ultrapure water with 1 ppb or lower TOC to be obtained. This ultrapure water production system includes a lower part having an anaerobic organism treatment part (12), and an upper part which is placed above the lower part via a separating wall $W_B$ having an opening (16) and which has a biological treatment equipment including an aerobic organism treatment part (1). Since lower anaerobic microorganisms and upper aerobic microorganisms consume nutrition sources for microorganisms, treated water which is difficult for microorganisms to propagate can be obtained. Further, not only TOC but also organic nitrogen compounds are treated by the microorganisms, by which treated water with low electrical conductivity can be obtained.

3 Claims, 5 Drawing Sheets

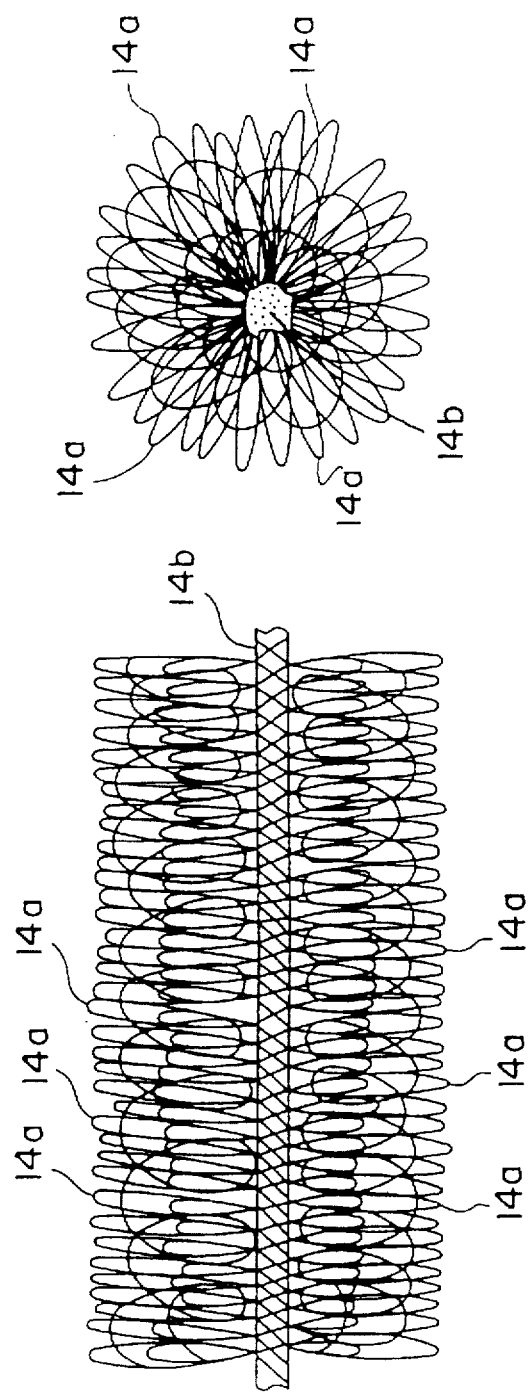

ULTRAPURE WATER PRODUCTION SYSTEM HAVING PRETREATMENT SYSTEM FOR PERFORMING BOTH ANAEROBIC AND AEROBIC ORGANISM TREATMENTS

BACKGROUND OF THE INVENTION

1. Field of the Invention

The present invention relates to an ultrapure water production system and, more particularly, to an ultrapure water production system which allows a reduction of TOC (Total Organic Carbon) in ultrapure water as well as a reduction of electrical conductivity of the ultrapure water. Further, the invention relates, to an ultrapure water production system which can recycle organic waste water of low concentration and provide ultrapure water in which both aerobic microorganisms and anaerobic microorganisms can hardly propagate.

2. Description of the Prior Art

The water quality required for ultrapure water in semiconductor factories has been becoming increasingly stricter as the semiconductor devices are advanced to further microstructures. Particularly in factories where semiconductors of 64M-DRAM or higher integration are manufactured, the TOC for ultrapure water is reduced to 1 ppb or lower.

Generally, an ultrapure water production system is comprised of a pretreatment system, a primary pure water production system, and a secondary pure water production system. The pretreatment system adopts a physical chemical treatment method such as coagulative settling, coagulative filtration, or coagulative pressurized floatation. Practical examples of such pretreatment systems are shown in FIGS. 4A and 4B. For the primary pure water production system, there has been available a system in which reverse osmosis membranes, ion exchange resins, ultraviolet sterilizers, and the like are combined together. The secondary pure water production system is comprised of ultraviolet oxidation equipment, ion exchange resins, ultrafiltration membranes, and the like.

The pretreatment system shown in FIG. 4B adopts the coagulative filtration method, which is a physical chemical treatment, as in the pretreatment system shown in FIG. 4A, thus being a pretreatment system purposed primarily for the treatment of turbidity in the water to be treated. Accordingly, the two pretreatment systems as shown in FIGS. 4A and 4B are ineffective for organic nitrogen compounds that are TOC contained in the water to be treated.

According to recent studies, it has been proved that the remaining TOC in the ultrapure water are due to organic nitrogen compounds originating from the raw water. The raw water herein refers to industrial water, city water, ground water, and the like. and the city water refers to potable water or tap water.

Generally, for the treatment of TOC in the water to be treated, there has been available a method using reverse osmosis membranes, ion exchange resins, ultraviolet oxidation equipment, and the like. However, in these days that the water quality of 1 ppb or lower TOC in the ultrapure water is demanded, there has also been developed a pretreatment system adopting a biological treatment method making use of aerobic microorganisms (Japanese Patent Laid-Open Publication No. HEI 6-63592), in addition to those systems used in the general TOC treatment methods.

Recently, with the increasing consciousness of water resources, there have also been planned a wide variety of ultrapure water production systems which will not limitlessly use city water, industrial water, or ground water as the raw water, but which allows the waste water to be recycled and reclaimed. For example, there has been developed a pretreatment system for ultrapure water production systems which treat organic nitrogen compounds by mixing, into the raw water, waste water containing several ppm of isopropyl alcohol (hereinafter, abbreviated as IPA) or acetone as an organic solvent (Japanese Patent Laid-Open Publication No. HEI 6-233997).

In this prior-art ultrapure water production system, organic nitrogen compounds contained in the water under treatment are first treated by a biological treatment equipment, which is the pretreatment system. Thereafter, the water under treatment is treated by the conventional primary pure water production system and secondary pure water production system. Thus, an ultrapure water with 1 ppb or lower TOC would finally be ensured.

In other words, a treatment to 1 ppb or lower content of TOC as the total organic matters could not be achieved without any pretreatment system including a biological treatment process. That is, it would be impossible to create a 1 ppb or lower ultrapure water only by combining coagulative settling, reverse osmosis membranes, ultrafiltration membranes, TOC-UV (Total Organic Carbon-Ultra Violet), or other like equipments together.

The aforementioned biological treatment equipment is an equipment which treats organic nitrogen compounds typified by urea with the use of not only aerobic microorganisms but also activated carbon as the filler material. However, because of the fact that the biological treatment equipment using activated carbon makes use of recycled water, when the recycled water is joined into the inflow water, the TOC concentration (concentration of the organic matters such as IPA and acetone) in the water under treatment reaches around 100 ppm. As a result, aerobic microorganisms rapidly propagate, such that the filler material portions are rapidly clogged by abnormal propagation of microorganisms, disadvantageously. Low-concentration organic waste water is one of those types of waste water which will cause a rapid increase of the TOC concentration in the treated water.

The problem that the filler material is clogged by propagation of aerobic microorganisms in the activated carbon or the like is a well known fact. In particular, abnormal propagation of microorganisms due to IPA or acetone could not be suppressed enough even if the activated carbon as the filler material is cleaned by frequent reverse cleaning. Thus, the reverse cleaning could not be a sufficient solution to the clogging of activated carbon due to the abnormal propagation.

The method of treating the organic nitrogen compounds in the water under treatment might be a combination of an anaerobic treatment and an aerobic treatment. However, for the prior art, due to the facts that the concentration of organic nitrogen compounds in the water under treatment is relatively low and that no suspended solids (SS) are present in the water under treatment, it would be impossible to retain microorganisms in the tank.

Even if a combination of an anaerobic treatment and an aerobic treatment is possible with a high concentration of organic nitrogen compounds and the presence of suspended solids to a moderate degree, it would conventionally be planned to implement the anaerobic treatment and the aerobic treatment with separate tanks, respectively. Therefore, two tanks of an anaerobic treatment tank and an aerobic treatment tank are necessitated, inevitably resulting in a large installation area.

In the ultrapure water production system of the prior art, it has been common practice to implement sterilizing treatment in the primary pure water production system and the secondary pure water production system. In the pretreatment system, on the other hand, since microorganisms do not propagate abnormally, sterilization would not be implemented.

In the primary pure water production system or the secondary pure water production system, ultraviolet sterilizers that produce sterilizing effect in short time are used. When the piping of the secondary pure water production system from its outlet to production equipment is cleaned once a year for around three hours, hydrogen peroxide is employed. However, there has been a problem that it would take a few hours to clean and drain out hydrogen peroxide completely from the piping in ultrapure water after the sterilizing cleaning with the hydrogen peroxide. Thus, although it may be conceived to neutralize the hydrogen peroxide with chemicals in order to start up the acquisition cycle of ultrapure water in short time, yet it is undesirable that the neutralizing agent would remain in the ultrapure water piping.

Hydrogen peroxide, unlike sodium hypochlorite, does not contain ions such as sodium ions or chlorine ions. Therefore, it is a sterilizer appropriate for the ultrapure water production system. However, with the use of 1% to a few % hydrogen peroxide, the sterilization reaction time is around three hours in many cases, posing a defect of a long sterilization reaction time. Accordingly, since the primary pure water production system and the secondary pure water production system would involve large size reaction equipment, hydrogen peroxide has not been used as the sterilizer.

Hydrogen peroxide, which involves a reaction time as much as around three hours, relatively longer than sodium hypochlorite or ultraviolet sterilizer, has not been used in the ultrapure water production system main equipment, i.e. in the primary pure water production system or the secondary pure water production system, other than for sterilization cleaning of the piping to the production equipment.

It has been established that chemical sterilization effects on microorganisms by hydrogen peroxide are as shown in (1) and (2) below:

(1) Proteins of microorganisms are denatured or degraded by the oxidation effect of hydrogen peroxide, so that microbial activity of the remaining microorganisms will be lowered in the following processes; and (2) With microorganisms present, hydrogen peroxide is decomposed by the enzymes of the microorganisms. Oxygen gas generated by this degradation would burst waxy membranes of the microorganisms, causing the microorganisms to fully die out.

FIG. 5 shows a conventional ultrapure water production system that implements the pretreatment using microorganisms. In this system, raw water given by industrial water and the recycled water after use in factory is introduced to a storage tank 101. The raw water introduced to the storage tank 101, after a retention time over three hours, is then introduced to an upfeed biodegradation equipment 117 by a water supply pump 123. This upfeed biodegradation equipment 117 is charged with fillers such as activated carbon, having therein aerobic microorganisms propagating. Next, the treated water (raw water subjected to treatment) is introduced to an aeration tank 120. In this aeration tank 120, the treated water is aerated with an aeration air discharged through a diffuser 126. The air to the diffuser 126 is supplied from a blower 124. Then, a part of the treated water in this aeration tank 120 is returned to the upflow biodegradation equipment 117 by an aeration tank pump 118, thus being circulated. Another part of the treated water in the aeration tank 120 is introduced to a pump pit 121, from which it is supplied to a separating membrane equipment 122 and a primary pure water production system 110 sequentially by a water supply pump 125.

In recent days' semiconductor factories, the grade of the water quality of ultrapure water has reached an ultimate level, and particularly, further reduction in individual items of water quality is demanded. Concurrently with the reduction, the reclamation of waste water is also demanded in terms of effective use of resources.

The prior art example as shown in FIG. 5 employs only aerobic microorganisms for the pretreatment, allowing the reduction of TOC to be expected. However, employing no anaerobic microorganisms, it does not include a mechanism for reducing and processing nitrate nitrogen into nitrogen gas. Therefore, a reduction in the electrical conductivity of treated water cannot be expected at all. Further, since the prior art system includes no oxidation process by hydrogen peroxide water, a strong oxidizing agent, viruses that are the smallest of microorganisms are not fully removed by the micro filter in the membrane separation equipment. If some trouble has erupted to the membrane of this membrane separation equipment, there is a risk that microorganisms may propagate in the whole primary pure water production system and secondary pure water production system. Particularly, in some cases of the prior art, sodium hypochlorite is added just before the RO equipment of the primary pure water production system so that sterilization is performed. In this case, however, since sodium bisulfite is added as a reducing agent after that, there is a problem that chlorine ions, sodium ions and others may remain in the treated water. In this type of prior art example, indeed the recycled water containing organic matters such as IPA can be utilized, but it is desirable that a wider range of waste water can be utilized.

If nitrate nitrogen originating from organic nitrogen compounds is treated by the pretreatment system in advance, the load of nitrate nitrogen to the primary pure water production system is relieved.

In the treatment by aerobic microorganisms in the prior art, nutrition sources for aerobic microorganisms are consumed, so that the propagation of aerobic microorganisms in the following processes is suppressed. However, the nutrition sources for anaerobic microorganisms have not been consumed, and moreover the primary and secondary pure water production systems are in closed state. Thus, the conditions are such that anaerobic microorganisms easily propagate, causing a great possibility that anaerobic microorganisms will propagate.

In the techniques as described in Japanese Patent Laid-Open Publications No. HEI 6-233997 or HEI 6-63592, as a method of cutting off microorganisms to the first and secondary pure water production systems, the UF (Ultra Filtration) membrane separation equipment or MF (Membrane Filtration) membrane separation equipment after the biological treatment is adopted.

In this prior art technique, however, when low-concentration organic waste water with, for example, an around 100 ppm TOC concentration is introduced as the under-treatment water to the pretreatment system, there arises a problem that microorganisms which have abnormally propagated may clog the UF membrane separation equipment or MF membrane separation equipment.

The sterilization in the prior art examples is one exerted not on the under-treatment water in the pretreatment system but on the under-treatment water in the primary pure water production system or the secondary pure water production system, in which process, with short reaction time, the sterilizer is added directly or ultraviolet rays are irradiated directly. Therefore, the sterilization in the prior art examples has a problem that its effect on the abnormal propagation of microorganisms due to low-concentration organic waste water is relatively small.

As described before, when particularly around 100 ppm TOC inflow water (mixed water of raw water and recycled water) is the water to be treated for the pretreatment system, the pretreatment system would result in a state of abnormal propagation of microorganisms. This matters from today's standpoint that an ultrapure water with the least microorganisms is demanded, where it matters that the pretreatment system has no strong sterilizing means.

When the water containing around 100 ppm TOC is treated by the pretreatment system, it is necessary to securely sterilize the treatment water by the pretreatment system in the stage preceding the primary pure water production system so that the possibility of the propagation of microorganisms in the primary pure water production system and the following is lessened as much as possible. The sterilization in this pretreatment system needs to be implemented by simple equipment and to cause no contamination within the system due to sterilizers after sterilization.

The reason why hydrogen peroxide has not been used in the pretreatment system of conventional ultrapure water production systems is that the TOC concentration in the water flowing into the pretreatment system does not reach 100 ppm so that abnormal propagation of microorganisms would not occur. Thus, even the short-time sterilization by sodium hypochlorite in the primary pure water production system has been no problem.

By contrast, in a pretreatment system which treats water of around 100 ppm TOC by mixing low-concentration organic waste water to the raw water, there is a need for a secure sterilizing process of a three hour or longer reaction time. This sterilizing process also needs to be a sterilizing process involving no increase in ions.

SUMMARY OF THE INVENTION

The object of the present invention is to provide a compact ultrapure water production system which allows recycled waste water to be reclaimed through a biological treatment without causing the clogging of treatment systems due to abnormal propagation of microorganisms, and which is able to obtain ultrapure water with 1 ppb or lower TOC.

In order to achieve the aforementioned object, according to the present invention, there is provided an ultrapure water production system comprising a raw water pretreatment system, a primary pure water production system, and a secondary pure water production system, the pretreatment system comprising:

a lower part having an anaerobic organism treatment part; and an upper part which is provided above the lower part via a separating plate having an opening and which has a biological treatment equipment including an aerobic organism treatment part.

According to this invention, in the pretreatment system of the ultrapure water production system, its lower part has an anaerobic organism treatment part while its upper part has an aerobic organism treatment part. Therefore, firstly, in the aerobic organism treatment part, the sludge in which microorganisms have propagated with time automatically reach the anaerobic organism treatment part of the lower part by natural precipitation. These microorganisms that have settled down to the lower part can be immobilized as anaerobic microorganisms.

In this anaerobic organism treatment part, less oxygen will be supplied as time elapses, such that anaerobic microorganisms will be generated and propagated with time lapse. As a result, anaerobic microorganisms come to increasingly occupy major part. In this way, an anaerobic treatment region with anaerobic microorganisms propagated is formed in the lower part, while an aerobic treatment region with aerobic microorganisms propagated is formed in the upper part. Therefore, the water introduced to this pretreatment system has nutrition sources for microorganisms treated (consumed) by both aerobic and anaerobic microorganisms. As a result, treated water in which both types of microorganisms are difficult to propagate therein can be obtained for the following processes.

Further, since this invention has a cubic structure made up of upper and lower parts, the installation area of equipment can be saved. Also since this invention has an anaerobic organism treatment part and an aerobic organism treatment part, not only TOC but also organic nitrogen compounds in the water under treatment can be treated. Furthermore, according to this invention, nitrate nitrogen generated during the treatment of organic nitrogen compounds can be removed by the microorganisms so that the electrical conductivity of the treated water can be improved eventually.

Therefore, according to this invention, there can be provided a compact ultrapure water production system which prevents any abnormal generation of microorganisms and thus allows recycled water to be microbially treated and thereby reclaimed without causing any clogging of the treatment systems, and which allows ultrapure water with 1 ppm or lower TOC to be obtained.

An embodiment of the present invention further comprises a treated water return means for returning treated water that has passed the anaerobic organism treatment part of the lower part and the aerobic organism treatment part of the upper part, to the anaerobic organism treatment part of the lower part so that the treated water is circulated through the anaerobic organism treatment part and the aerobic organism treatment part.

According to this embodiment, part of the treated water that has passed through the anaerobic and aerobic organism treatment parts is returned to the anaerobic organism treatment part, thus being circulated. Therefore, the organic nitrogen compounds in the treated water is treated first anaerobically with microorganisms in the anaerobic organism treatment part, and then oxidation-treated into nitrate nitrogen with microorganisms in the aerobic organism treatment part. Then, the treated water is again returned to the anaerobic organism treatment part, thus being circulated, so that the nitrate nitrogen is reduced up to nitrogen gas, resulting in nitrogen gas. As a result, the treated water is denitrified, so that the electrical conductivity in the treated water can be improved (lowered).

Therefore, according to this embodiment, the equipment cost and installation space can be saved, as compared with the prior art in which the anaerobic tank is independently installed without returning or circulating the treated water. That is, according to this embodiment, there can be provided a more compact, more efficient ultrapure water production system.

According to an embodiment of the present invention, there is provided an ultrapure water production system comprising:

a first water tank to which raw water is introduced, and which includes a lower part having an anaerobic organism treatment part having an immobilizing carrier, and an upper part placed above the lower part and having an aerobic organism treatment part; and a second water tank which is adjacent to and communicates with the aerobic organism treatment part of the upper part of the first water tank, wherein the aerobic organism treatment part of the upper part of the first water tank comprises:

a first contact circulation part including charcoal with microorganisms grown therein, a plastic filler with microorganisms grown therein, and an aeration means;

a second contact circulation part which is adjacent to the first contact circulation part and which includes charcoal with microorganisms grown therein, and a plastic filler with microorganisms grown therein; and a first reaction sprinkling part which is placed upper than the first, second contact circulation parts so as not to be submerged in treated water, and which includes charcoal with microorganisms grown therein and a plastic filler with microorganisms grown therein, wherein treated water pumped up from the second contact circulation part by an air lift pump is sprinkled over the first reaction sprinkling part, and the treated water is dropped down while being passed through the charcoal and the plastic filler, whereby the first reaction sprinkling part returns the treated water to the first, second contact circulation parts.

According to this embodiment, the immobilizing carrier is charged in the anaerobic organism treatment part, which is the lower part of the pretreatment system. Therefore, sludge that has occurred and precipitated in the aerobic organism treatment part of the upper part is immobilized to the immobilizing carrier. As a result, compared with the case where the precipitated sludge is merely deposited, the reaction area of the sludge and the treated water is increased so that the microbial treatment efficiency is improved.

Also according to this embodiment, the charcoal and plastic filler are charged in the first contact circulation part, the second contact circulation part, and the first reaction sprinkling part, from which the aerobic organism treatment part is made up, and moreover microorganisms are sufficiently propagating in the charcoal and plastic filler. As a result, organic nitrogen compounds can be oxidation-treated into nitrate nitrogen by the aerobic organism treatment part.

The charcoal first adsorbs organic nitrogen compounds, and then treats the adsorbed organic nitrogen compounds with the microorganisms that have propagated in the charcoal. Also, the plastic filler treats organic nitrogen compounds with the microorganisms that have propagated on the surface, and prevents the clogging due to generated sludge by providing increased spatial portions in the tank.

Further, in the first and second contact circulation parts, the treated water is circulated by air derived from the aeration means, while the treated water pumped up to the first reaction sprinkling part by the air lift pump makes contact with a larger quantity of air. Therefore, the organic nitrogen compounds can be oxidized more securely, so as to be made into nitrate nitrogen.

An embodiment of the present invention further comprises a hydrogen peroxide oxidation tank to which hydrogen peroxide water and treated water derived from the aerobic organism treatment part of the upper part are introduced; and a hydrogen peroxide degradation tank to which treated water containing hydrogen peroxide derived from the hydrogen peroxide oxidation tank is introduced.

According to this embodiment, the pretreatment system includes the hydrogen peroxide oxidation tank and the hydrogen peroxide degradation tank after the biological treatment equipment. Therefore, when a large amount of microorganisms are flowed out from the biological treatment equipment, they can be sterilized by hydrogen peroxide in the hydrogen peroxide oxidation tank, so that the microorganisms can be securely put into death. As a result, any propagation of microorganisms in the later processes can be suppressed. Consequently, there will not occur any clogging of the treatment system due to abnormal propagation of microorganisms.

Further, since the hydrogen peroxide degradation tank securely degrades the hydrogen peroxide mixed with the treated water, into water and oxygen gas, there is no possibility that hydrogen peroxide may remain in the primary pure water production system. Therefore, ultrapure water of good water quality can be obtained.

According to an embodiment of the present invention, the immobilizing carrier of the anaerobic organism treatment part of the lower part is made from vinylidene chloride.

According to this embodiment, anaerobic microorganisms are allowed to always live in the inner small cavities of vinylidene chloride. Therefore, even if the treated water containing dissolved oxygen is introduced to the anaerobic organism treatment part, anaerobic microorganisms are allowed to propagate stably in the vinylidene chloride. Thus, the anaerobic treatment of the treated water is carried out securely.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 3A and 3B are structural views of vinylidene chloride, which forms radial ring-shaped thread members;

DETAILED DESCRIPTION OF THE PREFERRED EMBODIMENTS

Hereinbelow, embodiments of the ultrapure water production system according to the present invention are described in detail with reference to the accompanying drawings.

(First Embodiment)

Figure 1:
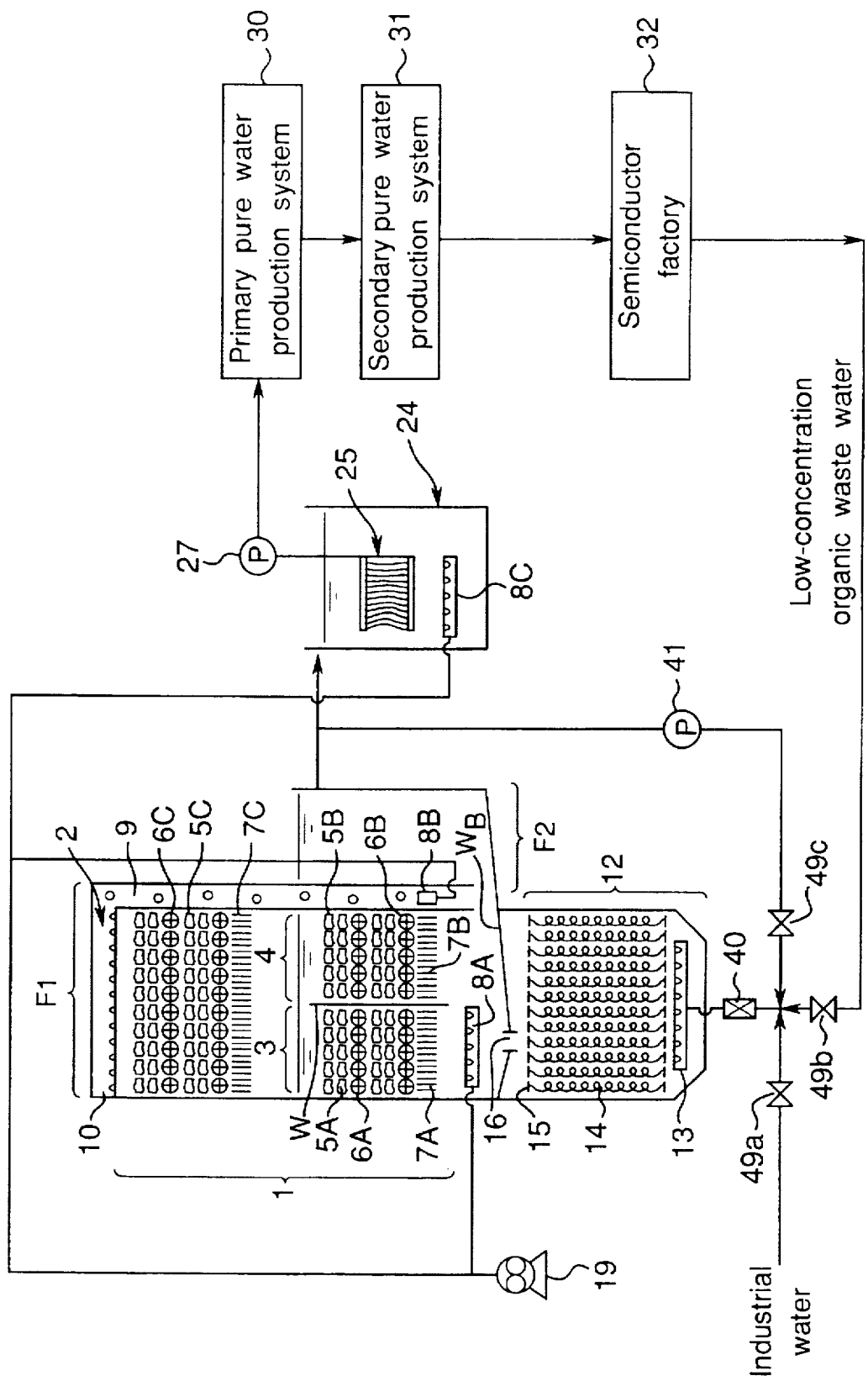
FIG. 1 is a view schematically showing a first embodiment of the ultrapure water production system of the present invention.

FIG. 1 shows a first embodiment of the ultrapure water production system of the present invention. In this first embodiment, industrial water and recycled water are introduced as raw water. The industrial water contains total organic matters including nitrogen compounds. The recycled water is low-concentration organic waste water derived from semiconductor factories. This first embodiment includes a process of anaerobically treating raw water and a process of aerobically treating the raw water.

The first embodiment comprises a first water tank F1, a second water tank F2, a membrane separation tank 24, a primary pure water production system 30, and a secondary pure water production system 31.

The first water tank F1 has an aerobic organism treatment part 1 forming an upper portion, and an anaerobic organism treatment part 12 forming a lower portion. This aerobic organism treatment part 1 comprises a first reaction sprinkling part 2 of the upper stage, and a first contact circulation part 3 and a second contact circulation part 4 of the lower stage. The first reaction sprinkling part 2 is placed above the first, second contact circulation parts 3, 4 so as not to be submerged in the treated water. This sprinkling part 2 has charcoal 5C and a plastic filler 6C. The charcoal 5C and the plastic filler 6C are alternately stacked on a lattice plate 7C. The lattice plate 7C is fixed to the side wall. Plastic fillers 6A, 6B, 6C may be selected from among the group of Raschig ring, Berl saddle, Intalox saddle, Terralet, Paul ring, and the like.

The first contact circulation part 3 has charcoal 5A and plastic fillers 6A alternately stacked on a lattice plate 7A. The second contact circulation part 4 also has charcoal 5B and plastic fillers 6B alternately stacked on a lattice plate 7B. The first contact circulation part 3 and the second contact circulation part 4 are adjoining to each other via a partitioning wall W, having their upper ends communicated with each other and having their lower ends communicated with each other. The first contact circulation part 3 has an air diffuser 8A placed at the bottom. This air diffuser 8A is connected to a blower 19. The second contact circulation part 4 is communicated at its bottom with the lower end opening of an air lift pump 9. Located within lower part of the air lift pump 9 is an air diffuser 8B which is connected to the blower 19. The air lift pump 9 extends upward along the second contact circulation part 4, bending horizontally above the top of the upper-stage first reaction sprinkling part 2. This horizontal bent portion forms a sprinkler 10. Water under treatment pumped up from the bottom of the second contact circulation part 4 by the air lift pump 9 is sprinkled to the first reaction sprinkling part 2 from the sprinkler 10. Then, the treatment water sprinkled to the sprinkling part 2 falls down while passing through the charcoal 5C and the plastic fillers 6C of the sprinkling part 2, thus returning to the first and second contact circulation parts 3 and 4. The water under treatment is circulated from the first contact circulation part 3 to the second contact circulation part 4 by aeration air derived from the air diffuser 8A.

Meanwhile, below the first, second contact circulation parts 3, 4, the anaerobic organism treatment part 12 is disposed while a bottom wall $W_B$ tapered downward is interposed therebetween. The bottom end of this bottom wall $W_B$ is opened, and a short, cylindrical-shaped inlet/outlet pipe 16 is fixed to this opening. The anaerobic organism treatment part 12 has vinylidene chloride 14 fixed to a metal fitting 15. The vinylidene chloride 14, as shown in FIGS. 3A and 3B, has a string-shaped thread member 14$b$ forming a ceter axis, and a plurality of ring-shaped portions 14$a$ extending radially from the thread member 14$b$. The thread member 14$b$ is knitted of thick threads. This thick thread has a plurality of small cavities, resulting in such a structure that especially denitrifying bacteria, which are anaerobic microorganisms, will easily propagate.

An inlet pipe 13 is disposed at the bottom of the anaerobic organism treatment part 12. This inlet pipe 13 is connected to a line mixer 40. To the line mixer 40, industrial water is introduced via a valve 49$a$, while low-concentration organic waste water derived from a semiconductor factory 32 is introduced via a valve 49$b$. Also to the line mixer 40, treated water from the second water tank F2 is introduced via a valve 49$c$.

The second water tank F2 is adjoining to the lower-stage second contact circulation part 4 of the aerobic organism treatment part 1 with the air lift pump 9 interposed therebetween. This second water tank F2 communicates with the bottom of the second contact circulation part 4.

Beside the second water tank F2, disposed is the membrane separation tank 24 to which the treated water from the second water tank F2 is introduced. The second water tank F2 and the membrane separation tank 24 are spaced from each other at a specified interval. This membrane separation tank 24 has a separating membrane 25. An air diffuser 8C is disposed below the separating membrane 25. This air diffuser 8C is connected to the blower 19. The separating membrane 25 also has a plurality of membrane filters arrayed horizontally, and the plurality of membrane filters are fixed to two pipes arranged above and below opposite to each other with a specified interval. Then the treated water filtrated by the plurality of membrane filters is pumped up by a separating membrane pump 27 and introduced to the primary pure water production system 30.

The secondary pure water production system 31 is disposed at the succeeding stage of the primary pure water production system 30. The treated water via the secondary pure water production system 31 is introduced to the semiconductor factory 32.

In the ultrapure water production system with the above constitution, industrial water, low-concentration organic waste water, and the treated water from the second water tank F2 are introduced to the line mixer 40. The industrial water, the low-concentration waste water, and the treated water are adjusted in flow rate by the valves 49$a$, 49$b$, and 49$c$. The low-concentration organic waste water contains hydrogen donors such as IPA.

The line mixer 40 mixes the industrial water, the low-concentration organic waste water, and the treated water together, transmitting mixed water to the inlet pipe 13. Then, the inlet pipe 13 spouts out the mixed water as water to be treated, uniformly from the bottom of the anaerobic organism treatment part 12 upward.

Meanwhile, the anaerobic organism treatment part 12 is charged with vinylidene chloride 14, and small cavities are present in the thread member 14$b$ of the vinylidene chloride 14, where anaerobic microorganisms are stably propagating in the small cavities. This propagation of anaerobic microorganisms is partly attributable to the fact that only a small amount of dissolved oxygen is contained in the low-concentration organic waste water contained in the mixed raw water (water to be treated) and the fact that the low-concentration organic waste water contains hydrogen donors such as IPA. Based on these preferable conditions, anaerobic microorganisms principally including denitrifying bacteria propagate in the vinylidene chloride 14. The anaerobic microorganisms principally including denitrifying bacteria have small bacteria floating, but the presence of the vinylidene chloride 14 as an immobilizing carrier allows anaerobic microorganisms to be maintained and propagated at high density within the anaerobic organism treatment part 12. Also since the vinylidene chloride 14 is made up of thin fibers, it has a large surface area and a minus surface potential. Accordingly, the vinylidene chloride 14 is in such a state that microorganisms or suspended matters will easily deposit thereon as it would be when static charges are generated on the fibers. The vinylidene chloride 14 is also fixed to the metal fitting 15 so that it will not be flowed away to the first contact circulation part 3 through the inlet/outlet pipe 16 even if the quantity of inflow water has rapidly increased.

Particularly under the condition that the concentration of microorganisms is relatively low as in the pretreatment system of the ultrapure water production system, it is possible for this vinylidene chloride 14 to effectively capture, attach, and immobilize most of the microorganisms including anaerobic microorganisms and aerobic microorganisms originating from the raw water. Like this, in this example, the under-treatment water is microbially treated without using coagulants and chemicals containing metal ions. This produces an advantage that the electrically conductivity of the treated water will not be increased.

As the immobilizing carrier, commonly available are various types of activated carbons, anthracite, zeolite, ion exchange resins, plastic molded products, and the like. However, as the filler material of anaerobic organism treatment part 12 in the pretreatment system of the ultrapure water production system, vinylidene chloride is the best in that it allows anaerobic microorganisms to attach and propagate at high density. If the microorganism treatment effect is sacrificed to some extent, it is possible to use activated carbons, anthracite, zeolite, ion exchange resins, plastic molded products, and the like.

Next, the treated water passes through the vinylidene chloride 14 where the anaerobic microorganisms the major part of which is denitrifying bacteria are immobilized, being anaerobically treated by the anaerobic organism treatment part 12, and thereafter passes through the inlet/outlet pipe 16, flowing into the first contact circulation part 3. The treated water introduced to the first contact circulation part 3 has its total organic matters i.e., undegraded TOC, adsorbed by charcoal 5A, 5B belonging to the first, second contact circulation parts 3, 4. Further, the total organic matters that are undegraded TOC are aerobically microbially oxidized by microorganisms which are propagating in the charcoal 5A, 5B and the plastic fillers 6A, 6B, thus finally resulting in nitrate nitrogen.

The air diffuser 8A located at lower part within the first contact circulation part 3 discharges the air supplied from the blower 19. As a result, an upward water stream is generated so that the treated water makes repetitive contact with the aerobic microorganisms that have propagated in the charcoal 5A, 5B and the plastic fillers 6A, 6B. Thus, the total organic matters contained in the treated water can be effectively treated into nitrate nitrogen.

Also, as shown in FIG. 1, the lattice plates 7A, 7B, 7C provided at lower part of the first contact circulation part 3 and the second contact circulation part 4 and at the lowermost part of the first reaction sprinkling part 2 have their lattices extending vertically and their projection area in the up-and-down direction smaller than their projection area in the right-and-left direction. Therefore, the treated water is allowed to easily pass through the lattice plates 7A, 7B, 7C and to easily pass through the first contact circulation part 3, the second contact circulation part 4, and the first reaction sprinkling part 2.

Then, when the air lift pump 9 is operated, the treated water located at the bottom of the second contact circulation part 4 goes up in the air lift pump 9, being diffused from the sprinkler 10 into the first reaction sprinkling part 2. It is noted that a widely used pump may be selected in place of the air lift pump 9. However, the air lift pump 9, if selected, offers an advantage that a large amount of treated water can be moved with relatively less power cost, as well as an effect that dissolved oxygen in the treated water is increased.

To the charcoal 5C and the plastic filler 6C of the first reaction sprinkling part 2, aerobic microorganisms attach and propagate to form a biological membrane.

The microorganisms that have propagated in the aerobic organism treatment part 1 are peeled off from the surfaces of the charcoal 5A, 5B, 5C and the plastic fillers 6A, 6B, 6C with time lapse, resulting in sludge. This peeled-off sludge, which has been quite aerobically oxidized, naturally settles down so as to be accumulated at the bottom of the first contact circulation part 3, i.e., at lower part of the air diffuser 8A. When the flow from the line mixer 40 to the first water tank F1 is stopped or decreased in flow rate (i.e., regulated in flow rate), the peeled-off sludge automatically goes down along the bottom surface inclined toward the inlet/outlet pipe 16, thus automatically flowing into the anaerobic organism treatment part 12 through the inlet/outlet pipe 16. Then, the peeled-off sludge reaches the vinylidene chloride 14 within the anaerobic organism treatment part 12, where it is immobilized. Since the peeled-off sludge immobilized in the vinylidene chloride 14 rapidly consumes the dissolved oxygen, the anaerobic state in the anaerobic organism treatment part 12 can be stably maintained.

Because the first water tank F1 that performs microbial treatment as described above has the vinylidene chloride 14 as well as the plastic fillers GA to 6C with many spatial portions, it serves as a storage tank for raw water and low-concentration organic waste water, taking advantage of its spatial capacity. Besides, the circulated water containing nitrate nitrogen derived from the second water tank F2 is returned to the anaerobic organism treatment part 12, so that the treated water can be treated in the anaerobic organism treatment part 12. Like this, the first water tank F1 has both the function as a storage tank and the function of microbial treatment.

Next, the treated water derived from the lower part of the second contact circulation part 4 in this first water tank F1 is introduced to its adjoining second water tank F2, that is, to a first settling tank F2. In this first settling tank F2, the circulated treated water is separated into microbial membrane sludge and supernatant liquid. This supernatant liquid separated from the microbial membrane sludge flows out of the first settling tank F2, being divided into two along the piping. One of the two divisional flows of treated water is transferred by a circulation pump 41, mixed with the raw water (industrial water) and low-concentration organic waste water by the line mixer 40, and introduced to the anaerobic organism treatment part 12. As a result, nitrate nitrogen contained in the treated water (circulated water) diverged at the outlet of the first settling tank F2 is treated by the anaerobic organism treatment part 12, resulting in nitrogen gas. The treated water circulated by the circulation pump 41, differing as it is depending on the concentration of the nitrate nitrogen in the treated water, preferably occupies 60% or more of the total quantity of the treated water derived from the first settling tank F2.

Meanwhile, another flow of the diverged two flows of treated water is introduced to the membrane separation tank 24. In this membrane separation tank 24, all the microorganisms and suspended matters contained in the treated water are securely separated. The separation membrane 25 may be selected from ultrafiltration membranes or micro filters. For the separation membrane 25 in the membrane separation tank 24 of FIG. 1, a submerged membrane is selected, but a land-type pre-blocks ultrafiltration membrane may alternatively be selected. In this first embodiment, a micro filter as a submerged membrane made by Mitsubishi Rayon K. K. and an ultrafiltration membrane as a submerged membrane made by K. K. Kubota were used. However, they are not limitative. With the use of a submerged membrane, whereas the cleaning of the membrane is of importance, the separation membrane 25 can be cleaned by the air discharged through the air diffuser 8C located below the separation membrane 25. The separation membrane 25 is connected to the separating membrane pump 27 by piping, so that the treated water is supplied to the primary pure water production system by the separating membrane pump 27.

These primary pure water production system 30 and secondary pure water production system 31 are similar to those used in the conventional pure water production system, and ultrapure water with improved TOC and electrical conductivity is produced by the primary, secondary pure water production systems 30, 31. Then, the produced ultrapure water is supplied to the semiconductor factory 32, where it is used in production equipment.

As shown above, according to this first embodiment, the raw water containing organic nitrogen compounds, the low-concentration organic waste water containing hydrogen donors, and the circulated water are mixed up by the line mixer 40, and introduced to the anaerobic organism treatment part 12. In the anaerobic organism treatment part 12, nitrate nitrogen is effectively removed in the presence of the hydrogen donors such as IPA. Subsequently, undegraded organic matters that cannot be degraded under anaerobic conditions are subjected to microbial treatment and adsorption treatment by making use of aerobic microorganisms and charcoal 5A, 5B, 5C. Thus, the organic nitrogen compounds originating from the raw water are oxidized finally to nitrate nitrogen. The nitrate nitrogen is circulated several times between the first water tank F1 and the second water tank F2, being thereby denitrified.

The circulation of treated water through the anaerobic organism treatment part 12, the aerobic organism treatment part 1, and the first settling tank 11 means that the nutrition sources for both anaerobic and aerobic microorganisms to propagate are eaten, or treated, by those microorganisms.

As a result of these, according to this first embodiment, the total organic matters containing organic nitrogen compounds in the treated water can be treated to 1 ppb or lower TOC at the end of treatment, while the electrical conductivity of the treated water can be reduced by ion removal. Still, the generation and propagation of microorganisms can be suppressed as much as possible in the primary and secondary pure water production systems.

(Second Embodiment)

Figure 2:
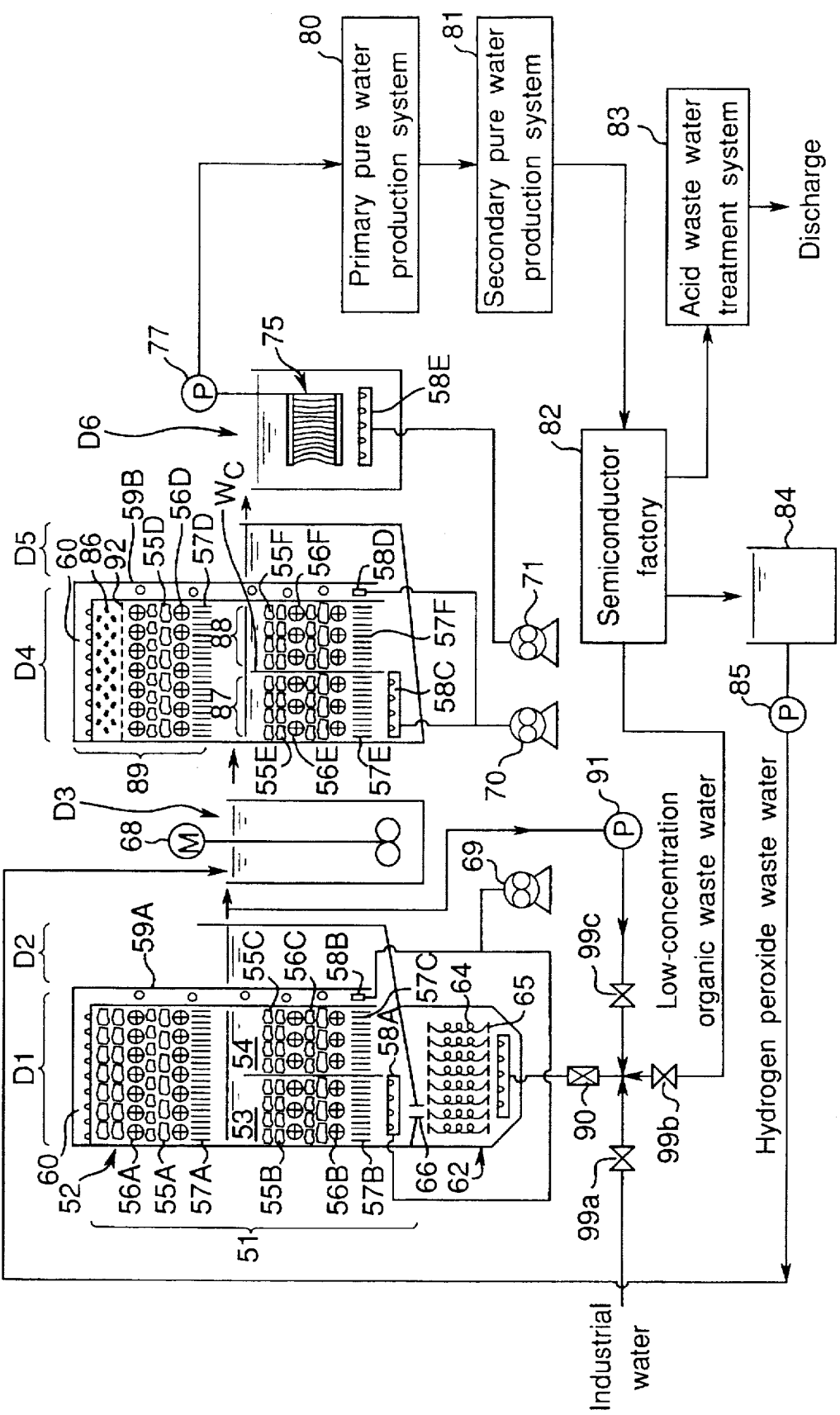
FIG. 2 is a view schematically showing a second embodiment of the ultrapure water production system of the present invention.
Figure 4A:
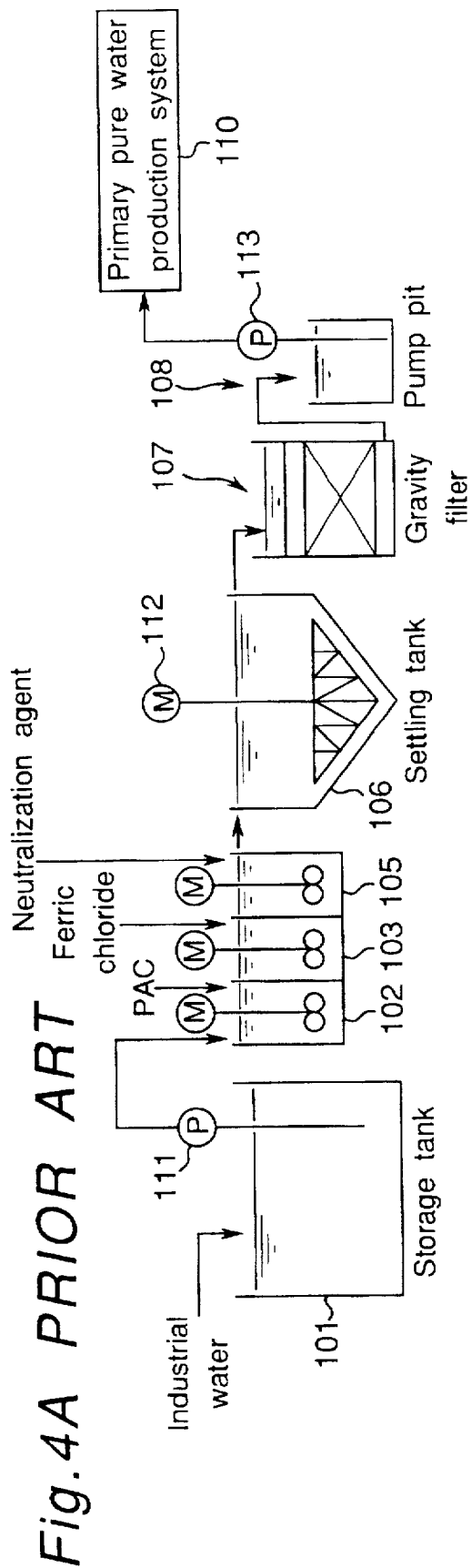
FIG. 4A is a view schematically showing an ultrapure water production system according to the prior art.
Figure 4B:
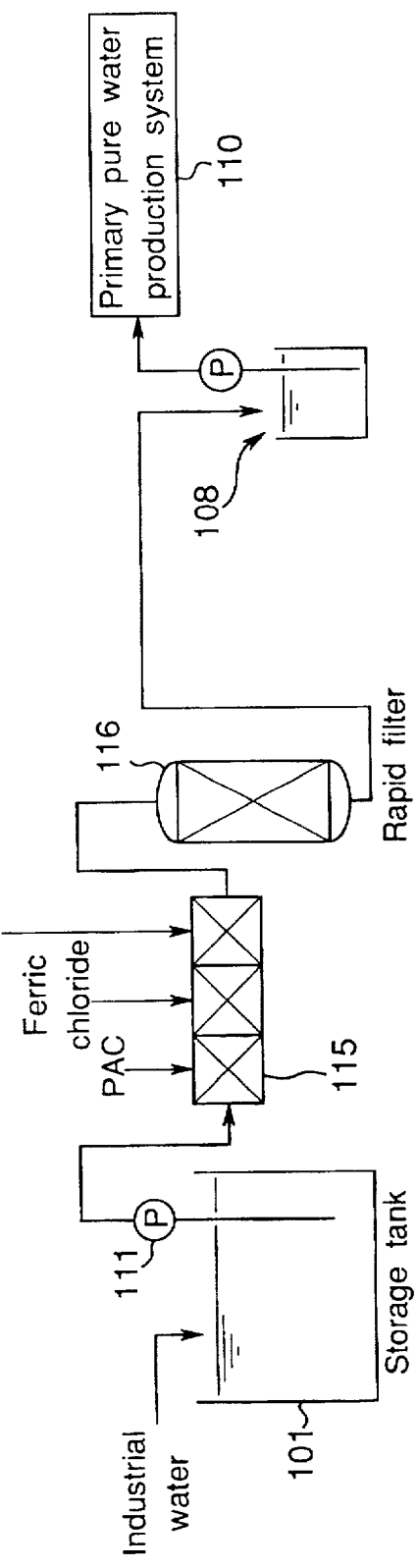
FIG. 4B is a view schematically showing another example of the prior art system.
Figure 5:
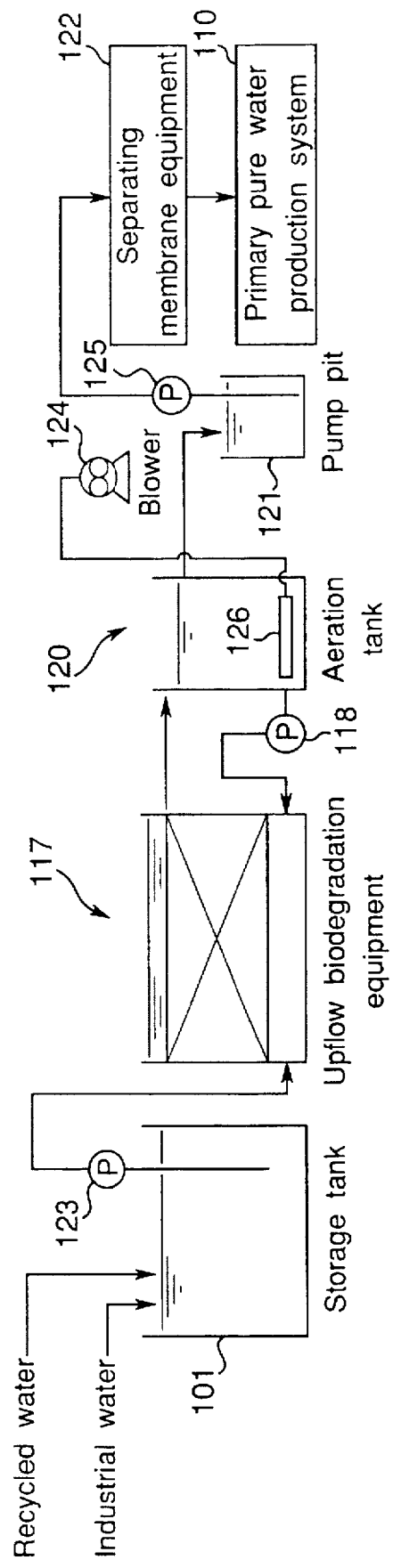
FIG. 5 is a view schematically showing still another example of the prior art system.

Next, FIG. 2 shows a second embodiment of the ultrapure water production system according to the present invention. The first water tank D1 and the second water tank D2 of this second embodiment are similar in construction to the first water tank F1 and the second water tank F2, respectively, of the first embodiment. A sixth water tank D6 of the second embodiment is similar in construction to the membrane separation tank 24 of the first embodiment. This second embodiment differs from the first embodiment in that the system has a third water tank D3, a fourth water tank D4, and a fifth water tank D5 between the second water tank D2 and the sixth water tank D6, and that it also has a hydrogen peroxide storage tank 84. Therefore, the second embodiment is described with emphasis placed on the differences from the first embodiment.

The hydrogen peroxide storage tank 84 stores hydrogen peroxide waste water derived from a semiconductor factory 82. The hydrogen peroxide waste water from the hydrogen peroxide storage tank 84 is supplied to the third water tank D3 (hydrogen peroxide oxidation tank) by a pump 85.

The hydrogen peroxide oxidation tank D3 has a stirrer 68. The treated water from the hydrogen peroxide oxidation tank D3 is introduced to the fourth water tank D4. The fourth water tank D4 is a hydrogen peroxide degradation tank D4. The hydrogen peroxide degradation tank D4 comprises a lower-stage third contact circulation part 87, a fourth contact circulation part 88, and an upper-stage second reaction sprinkling part 89. The second reaction sprinkling part 89 is disposed above the contact circulation parts 87, 88 so as not to be submerged in the treated water. The contact circulation parts 87, 88 are adjacent to each other and partitioned by a partitioning wall $W_c$ so as to communicate with each other at their top and bottom. The contact circulation part 87 has a plastic filler 56E and charcoal 55E alternately stacked on a lattice plate 57E. Also, the contact circulation part 88 has a plastic filler 56F and charcoal 55F alternately stacked on a lattice plate 57F. An air diffuser 58C is disposed under the contact circulation part 87. This air diffuser 58C is connected to a second blower 70.

Meanwhile, the second reaction sprinkling part 89 has a plastic filler 56D and charcoal 55D alternately stacked on a lattice plate 57 fixed to the bottom. A mesh sheet 92 is disposed above the uppermost-stage plastic filler 56D. Further stacked on this mesh sheet 92 is activated carbon 86. On this activated carbon 86, a sprinkler 60 is disposed. This sprinkler 60 communicates with an air lift pump 59B extending vertically. This air lift pump 59B reaches the bottom of the lower-stage fourth contact circulation part 88. An air diffuser 58D is disposed slightly above the lower end of the air lift pump 59B. This air diffuser 58D is connected to the second blower 70.

Adjacent to the air lift pump 59B, disposed is the fifth water tank (second settling tank) D5 whose bottom is communicating with the fourth contact circulation part 88. Adjacent to this second settling tank D5 disposed is the sixth water tank D6. This sixth water tank D6 is a membrane separation tank DG. The treated water from this membrane separation tank D6 passes through the first pure water production system 80 and the secondary pure water production system 81 via a separating membrane pump 77, and is delivered to the semiconductor factory 82 as ultrapure water. Acid waste water containing fluoric acid discharged from the semiconductor factory 82 is supplied to an acid waste water treatment system 83. Meanwhile, hydrogen peroxide waste water discharged from the semiconductor factory 82 is supplied to the hydrogen peroxide storage tank 84. Low-concentration organic waste water discharged from the semiconductor factory 82 is introduced to a line mixer 90 via a valve 99b.

In the ultrapure water production system with the above constitution, the treated water microbially treated by the first water tank D1 is introduced to the second water tank (first settling tank) D2, and the treated water flowed out from the first settling tank 61 is divided into two. One part of the treated water is circulated to an anaerobic organism treatment part 62 by a circulation pump 91 as in the first embodiment of FIG. 1, and in particular nitrate nitrogen in the treated water is treated to nitrogen gas. The other part of the two divisional flows of treated water is flowed into the third water tank D3, or the hydrogen peroxide oxidation tank D3.

In the treated water that is the supernatant liquid of the second water tank D2, suspended microorganisms are present. Therefore, introduced to the hydrogen peroxide oxidation tank D3 is hydrogen peroxide waste water that has been used in the production equipment of the semiconductor factory 82 and diluted with ultrapure water. Of course, it may be hydrogen peroxide water as an unused chemical, other than hydrogen peroxide waste water, which is introduced to the hydrogen peroxide oxidation tank D3. Used hydrogen peroxide water derived from the semiconductor factory 82 is temporarily stored in the hydrogen peroxide storage tank 84 and then introduced to the hydrogen peroxide oxidation tank D3 by the hydrogen peroxide transfer pump 85. The hydrogen peroxide water introduced to the hydrogen peroxide oxidation tank D3 is stirred and mixed with the treated water by the stirrer 68. Then, the total organic matters as trace TOC in the treated water and suspended living microorganisms (living bacteria) are vigorously chemically oxidized by the hydrogen peroxide water. Then the active microorganisms are chemically oxidized up to their cell level. In order to control the addition amount of hydrogen peroxide water, an oxidation/reduction electrometer (not shown) may be installed in the hydrogen peroxide oxidation tank D3. The hydrogen peroxide water from the semiconductor factory 82, even if it has been used in the factory, is a result of diluting electronic industry use hydrogen peroxide water with ultrapure water in the production equipment, and therefore there is no problem in terms of product quality for use in the pretreatment system of the ultrapure water production system. Also, since unused new hydrogen peroxide water does not need to be used, it has an effect of helping to reduce the running cost. As the hydrogen peroxide waste water to be introduced to the hydrogen peroxide storage tank 84 would conventionally be treated with high cost, it means that the initial cost and the running cost can be reduced.

The treated water chemically oxidized with hydrogen peroxide water in the hydrogen peroxide oxidation tank D3 subsequently flows into the hydrogen peroxide degradation tank D4.

Generally, the hydrogen peroxide is degraded by using sodium hydrogen-sulfite ($NaHSO_3$) or activated carbon. However, the addition of chemicals to the treated water causes increase in ions, thus unsuitable for the production of pure water. Accordingly, in this embodiment, the hydrogen peroxide degradation tank D4 uses the activated carbon 86 and the charcoal 55D, 55E, 55F to treat hydrogen peroxide. The activated carbon 86 is charged at the top of the second reaction sprinkling part 89 in the hydrogen peroxide degradation tank D4. This activated carbon 86 has a hydrogen peroxide degrading ability, i.e., an ability as a catalyst several times higher than that of charcoal. Accordingly, by the presence of this activated carbon 86, hydrogen peroxide can be degraded more securely even when there has occurred a change in the concentration of the hydrogen peroxide.

In the hydrogen peroxide degradation equipment of the prior art, activated carbon as a catalyst and others are submerged in the treated water, in which case the catalyst would flow out by generated oxygen gas foams. By contrast, in this second embodiment, Bincho charcoal, which is larger size than activated carbon, is used as charcoal 55E, 55F in the submerged third, fourth contact circulation parts 87, 88. Therefore, the possibility of the flow-out of catalyst has been eliminated. Moreover, the activated carbon 86, which is relatively fine structured and good at hydrogen peroxide degrading ability, is installed at the top of the second reaction sprinkling part 89 that will not be submerged in the treated water. Thus, there is no possibility that the activated carbon 86 may be flowed away.

Then the air diffuser 58C placed at the lowermost portion of the third contact circulation part 87 discharges air supplied from the second blower 70. This discharged air causes an upward water stream to be generated, so that the treatment efficiency of treated water can be improved.

The third contact circulation part 87 and the fourth contact circulation part 88 are similar in constitution to a first contact circulation part 53 and a second contact circulation part 54, respectively. Besides, the first contact circulation part 53 and the second contact circulation part 54 are purposed for the charcoal adsorption effect on the total organic matters including organic nitrogen compounds as well as for biological treatment with microorganisms which propagate in the charcoal. The third contact circulation part 87 and the fourth contact circulation part 88, on the other hand, are purposed for the secure degradation treatment of hydrogen peroxide with most of the charcoal merely used as a catalyst. However, since the third, fourth contact circulation parts 87, 88 have much charcoal 55E, 55F, the adsorption effect of the charcoal allows a high treatment effect of the total organic matters including extremely trace organic nitrogen compounds, i.e., TOC to be expected resultantly.

Next, the treated water, of which hydrogen peroxide has securely been treated by the hydrogen peroxide degradation tank D4, flows into the second settling tank D5. Then, the treated water is separated into supernatant liquid and precipitate by the second settling tank D5.

Next, the treated water from the second settling tank D5, which is the fifth water tank, flows into the membrane separation tank D6. The membrane separation tank D6 has a separating membrane 75 and an air diffuser 58E. The air discharged from the air diffuser 58E cleans the separating membrane 75 with air. This air cleaning prevents the separating membrane 75 from being clogged. As in the first embodiment of FIG. 1, also in this second embodiment, the treated water that has flowed into the membrane separation tank D6 has dead bodies of microorganisms, suspended matters, and the like physically filtrated and removed by the separating membrane 75. It is noted that for the separating membrane 75, as in the first embodiment of FIG. 1, is preferably selected an ultrafiltration membrane or micro filter that can filtrate about 0.1 µm or more substances such as dead bodies of microorganisms and suspended matters. The performance of the separating membrane 75 may be determined according to the purpose of treatment.

Next, the treated water filtered by the separating membrane 75 is supplied to the first pure water production system 80 by the separating membrane pump 77, where it is treated into primary pure water. The primary pure water is then treated to higher level by the secondary pure water production system 81 of the succeeding stage of the primary pure water production system 80, thus resulting in ultrapure water with the TOC and electrical conductivity reduced.

In addition, the pretreatment system in the ultrapure water production system of the present invention may be implemented by any one that mixes the raw water and low-concentration organic waste water together and treats it, without any particular limitations of its mixing ratio.

Whereas this mixing ratio varies from semiconductor factory to semiconductor factory, the low-concentration organic waste water is, in many cases, 10 wt % to 30 wt % relative to the raw water. However, too high a TOC concentration in the low-concentration organic waste water would make it impossible to ensure the ratio of 1 ppb or lower in the ultrapure water at the terminal end of the ultrapure water production system.

Next, practical experimental examples are explained.

EXPERIMENTAL EXAMPLE 1

An experimental use pretreatment system having the same construction as that of the pretreatment system of the first embodiment as shown in FIG. 1 was made up. The total volume of the aerobic organism treatment part 1 and the anaerobic organism treatment part 12, from which the first water tank Fl is made up, was set to approximately 1.5 cubic meters, the volume of the first settling tank F2, which is the second water tank F2, was set to 0.4 cubic meter, and the volume of the membrane separation tank 24 was set to 0.5 cubic meter. In this arrangement, a pretreatment experiment was carried out.

In this case, water to be treated having an electrical conductivity of 182 µs/cm and a TOC concentration of 2.4 ppm prior to the pretreatment could be made into treated water having an electrical conductivity of 105 µs/cm and a TOC concentration of 0.7 ppm.

EXPERIMENTAL EXAMPLE 2

An experimental use pretreatment system having the same construction as that of the pretreatment system of the second embodiment as shown in FIG. 3 was made up. The total volume of the aerobic organism treatment part 51 and the anaerobic organism treatment part 62, from which the first water tank D1 is made up, was set to approximately 1.5 cubic meters, the volume of the second water tank D2 (first settling tank) was set to 0.4 cubic meter, and the volume of the third water tank D3 (hydrogen peroxide oxidation tank) was set to 0.6 cubic meter. Also, the total volume of the second reaction sprinkling part 89, the third contact circulation part 87, and the fourth contact circulation part 88, from which the fourth water tank D4 is made up, was set to 1.0 cubic meter, the volume of the fifth water tank D5 (second settling tank) was set to 0.4 cubic meter, and the volume of the sixth water tank D6 (membrane separation tank) was set to 0.5 cubic meter. In this arrangement, a pretreatment experiment was carried out.

In this case, industrial water (water to be treated) having an electrical conductivity of 180 µs/cm and a TOC concentration of 2.5 ppm prior to the pretreatment could be made into treated water having an electrical conductivity of 92 µs/cm and a TOC concentration of 0.5 ppm.

EXPERIMENTAL EXAMPLE 3

Making use of the pretreatment system of the second embodiment as shown in FIG. 2, the TOC concentration of the water to be treated by adding IPA to low-concentration organic waste water was enhanced so that the TOC concentration of the water to be treated prior to the pretreatment was elevated to 103 ppm. Then the water quality was measured at the outlet of the membrane separation tank D6, which is the sixth water tank. In this case, the TOC could be reduced to 1.2 ppm. Further, the pretreated water in these Experimental Examples 1 to 3 was introduced to an experimental equipment of the primary pure water production system and an experimental equipment of the secondary pure water production system in the succeeding stages of the pretreatment system, followed by treatment. As a result, 1 ppb or lower TOC ultrapure water could be obtained.

As apparent from the above description, according to the present invention, there can be provided ultrapure water in which the total organic matters containing organic nitrogen compounds can be treated, while the electrical conductivity can be improved concurrently, and further in which neither anaerobic nor aerobic microorganisms almost propagate. Therefore, this ultrapure water production system can contribute to improvement in the yield of IC (Integrated Circuit) production, and implement resource-saving effect by virtue of its reclamation of low-concentration organic waste water and hydrogen peroxide waste water.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An ultrapure water production system comprising:
    a first water tank to which raw water is introduced, and which includes a lower part having an anaerobic organism treatment part having an immobilizing carrier, and an upper part placed above the lower part and having an aerobic organism treatment part; and
    a second water tank which is adjacent to and communicates with the aerobic organism treatment part of the upper part of the first water tank, wherein
    the aerobic organism treatment part of the upper part of the first water tank comprises:
    a first contact circulation part including charcoal with microorganisms grown therein, a plastic filler with microorganisms grown therein, and an aeration means;
    a second contact circulation part which is adjacent to the first contact circulation part and which includes charcoal with microorganisms grown therein, and a plastic filler with microorganisms grown therein; and
    a first reaction sprinkling part which is placed upper than the first, second contact circulation parts so as not to be submerged in treated water, and which includes charcoal with microorganisms grown therein and a plastic filler with microorganisms grown therein, wherein treated water pumped up from the second contact circulation part by an air lift pump is sprinkled over the first reaction sprinkling part, and the treated water is dropped down while being passed through the charcoal and the plastic filler, whereby the first reaction sprinkling part returns the treated water to the first, second contact circulation parts.

2. The ultrapure water production system according to claim 1, further comprising:
    a hydrogen peroxide oxidation tank to which hydrogen peroxide water and treated water derived from the aerobic organism treatment part of the upper part are introduced; and
    a hydrogen peroxide degradation tank to which treated water containing hydrogen peroxide derived from the hydrogen peroxide oxidation tank is introduced.

3. The ultrapure water production system according to claim 1, wherein the immobilizing carrier of the anaerobic organism treatment part of the lower part is made from vinylidene chloride.

* * * * *